UNITED STATES PATENT OFFICE.

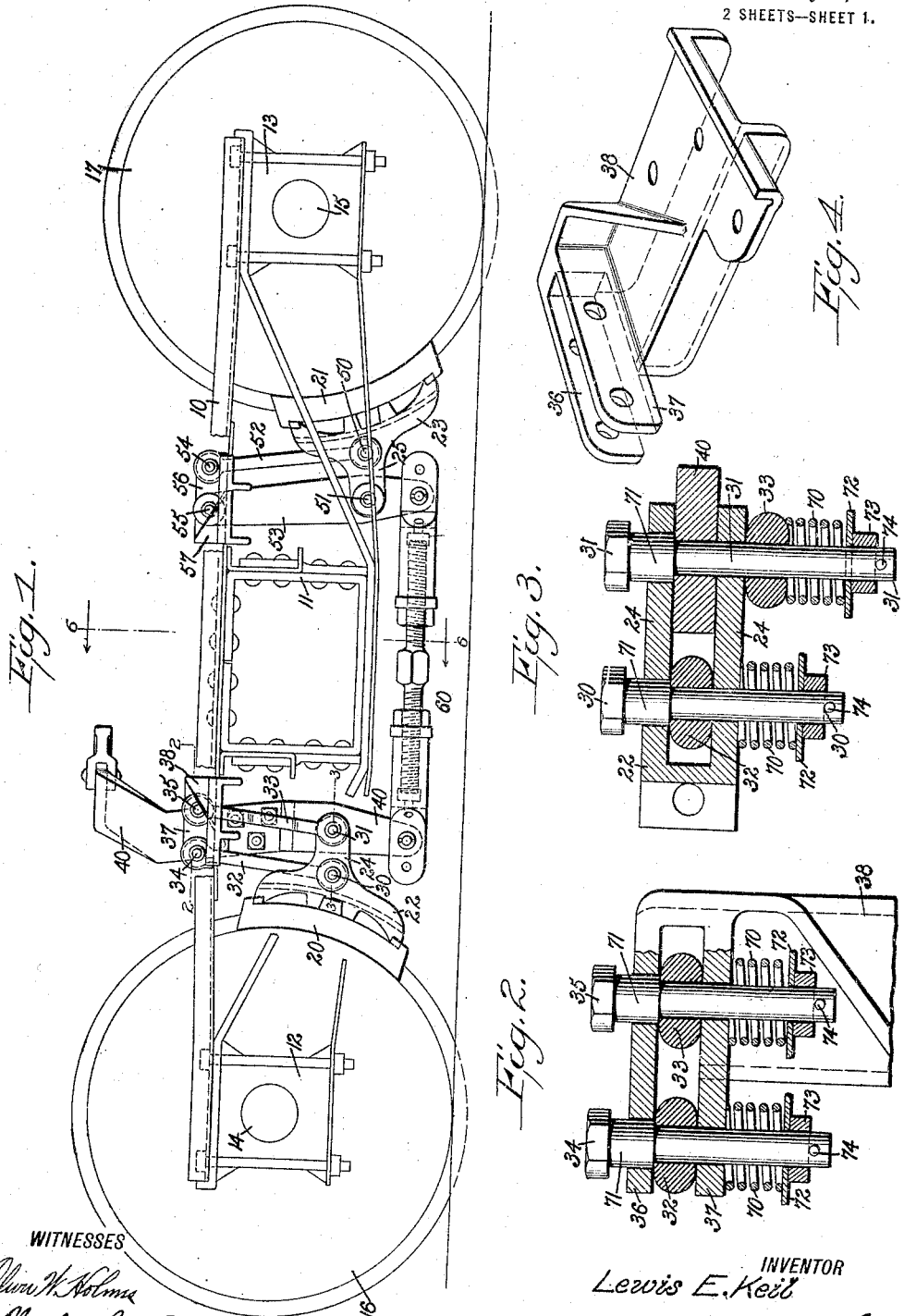

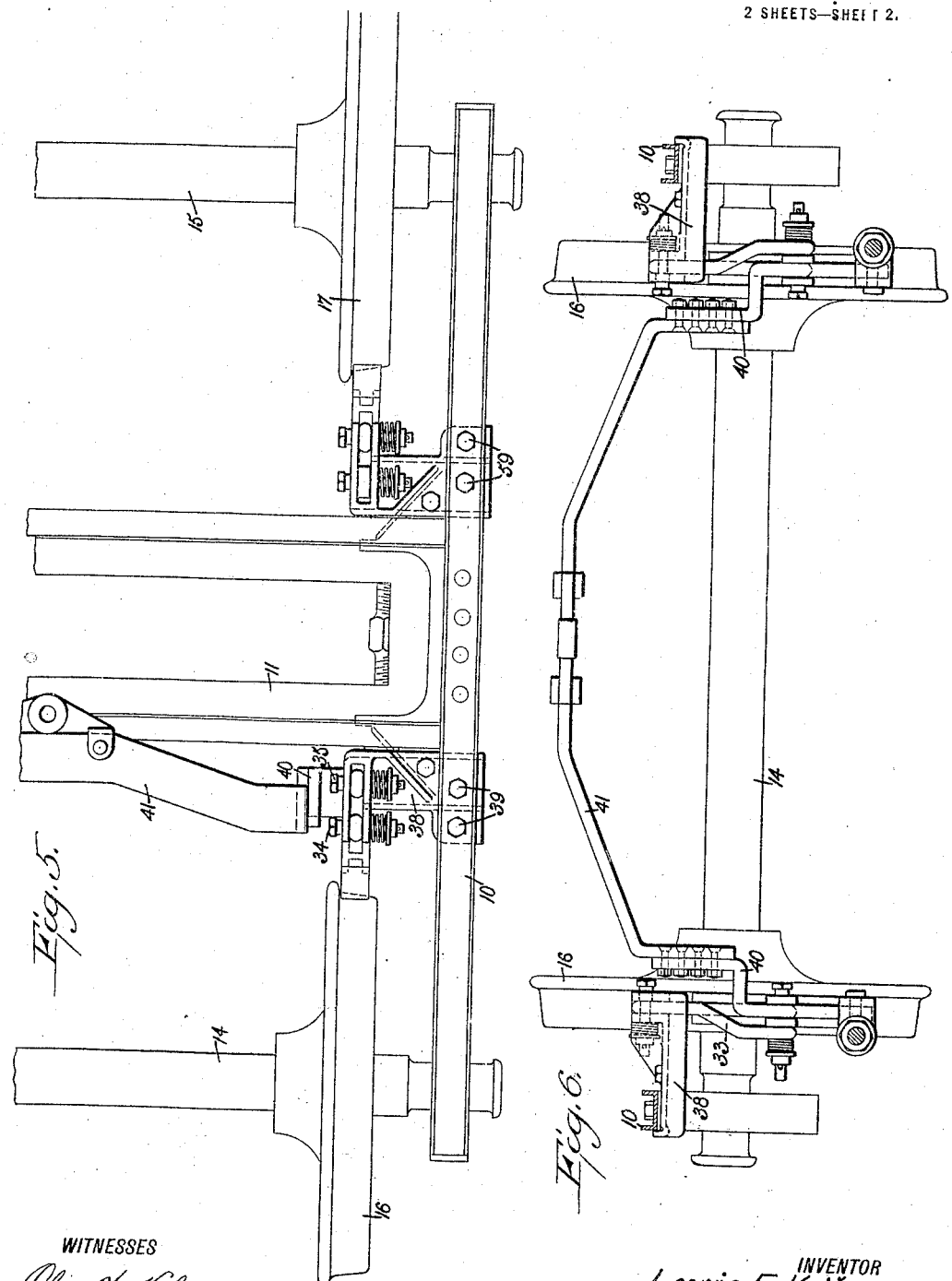

LEWIS E. KEIL, OF ST. LOUIS, MISSOURI, ASSIGNOR TO ST. LOUIS CAR COMPANY, OF ST. LOUIS, MISSOURI, A CORPORATION OF MISSOURI.

BRAKE-HANGER.

1,303,069.   Specification of Letters Patent.   Patented May 6, 1919.

Application filed May 15, 1917. Serial No. 168,647.

*To all whom it may concern:*

Be it known that I, LEWIS E. KEIL, a citizen of the United States, and a resident of St. Louis, in the State of Missouri, have invented a new and Improved Brake-Hanger, of which the following is a full, clear, and exact description.

The invention relates to the brake mechanism of railway car trucks, and its object is to provide a new and improved brake hanger arranged to keep the brake shoes at all times in exact alinement with the car wheels to prevent uneven wear of the brake shoes. Another object is to prevent rattling and chattering in an up and down direction when the brakes are applied.

In order to accomplish the desired result, use is made of a parallel link suspension for the brake head. Use is also made of anti-rattling and anti-chattering means connected with the link suspension.

A practical embodiment of the invention is represented in the accompanying drawings forming a part of this specification, in which similar characters of reference indicate corresponding parts in all the views.

Figure 1 is a side elevation of the brake hanger, as applied;

Fig. 2 is an enlarged sectional plan view of the brake hanger on the line 2—2 of Fig. 1;

Fig. 3 is a similar view of the same on the line 3—3 of Fig. 1;

Fig. 4 is a perspective view of one of the hanger brackets;

Fig. 5 is a plan view of the brake hanger as applied; and

Fig. 6 is a cross section of the same on the line 6—6 of Fig. 1.

The truck frame illustrated in the drawing consists essentially of the side beams 10 rigidly connected with each other at the middle by a cross beam 11. On the ends of the side beams 10 are rigidly attached journal boxes 12 and 13, in which are journaled the axles 14 and 15 carrying the car wheels 16 and 17. The peripheral faces of the car wheels 16 and 17 on each side of the car truck are adapted to be engaged by brake shoes 20 and 21 attached to brake heads 22, 23, provided with flanges 24, 25. The flanges 24 of the brake head 22 are provided with two transversely extending pivots 30, 31 arranged approximately in a horizontal plane, and the said pivots 30 and 31 are engaged by the lower ends of two parallel links 32 and 33 extending upwardly and engaging transverse pivots 34 and 35 held in the members 36 and 37 of a hanger bracket 38 fastened by bolts 39 or other fastening means to the corresponding side beam 10. The axes of the pivots 34 and 35 extend in a plane parallel to the plane in which the axes of the pivots 30, 31 are located, and the pivots 34, 35 are spaced the same distance apart as the pivots 30, 31 to provide an accurate parallel link suspension for the brake head 22 and its shoe 20. By reference to Figs. 3 and 6, it will be seen that the link 33 is slightly bent outward at its lower portion to engage its pivot 31 outside of one of the flanges 24 while the other link 32 extends between the flanges 24. The pivot 31 is engaged between the flanges 24 by the usual brake lever 40 connected by a crossbar 41 with the corresponding brake lever 40 on the other side, as indicated in Figs. 5 and 6.

The brake head 23 is provided at its flanges 25 with two pivots 50 and 51 similar to the pivots 30 and 31 and connected by parallel links 52 and 53 with pivots 54, 55 mounted in the bifurcated end 56 of a bracket 57 similar to the bracket 38 and likewise fastened by bolts 59 to the corresponding side beams 10 of the brake frame. The link 53 is extended at its lower end to form a brake lever pivotally connected by the usual adjustable link 60 with the lower end of the brake lever 40 so that when the latter is actuated the two brake shoes 20 and 21 are moved in braking engagement with the peripheral faces of the corresponding car wheels 16 and 17. It is understood that the parallel link suspension for the brake head 23 carrying the brake shoe 21 is the same as the one for the brake head 22, carrying the brake shoe 20, the only difference being that the link 53 is also extended to form a brake lever. It will be noticed that when the brake mechanism is actuated the parallel link suspension causes a uniform movement of the brake shoes 20 and 21 toward and from the peripheral faces of the car wheels 16 and 17, thus preventing any tipping of the shoe and unequal wear thereof. It will also be noticed that as the axles 14 and 15 are journaled in journal boxes 12 and 13 rigidly attached to the side beams 10 carrying the brackets 38 and 57, the shoes 20 and 21 are always held in accurate alinement with the car wheels by the parallel suspension above described.

In order to prevent rattling and chattering of the parallel link suspension, the following arrangement is made, special reference being had to Figs. 2 and 3: Each of the pivots 30, 31, 34, 35, 50, 51, 54, 55 is pressed in the direction of its length by a spring 70, and each pivot is provided with a shoulder 71 bearing against the corresponding link or lever at one side to press the same against the corresponding member of the heads 22, 23 and the brackets 38, 57. The outer ends of each spring 70 rests against a washer 72 resting on a collar 73 held in place on the corresponding pivot by a pin 74. In the case of the pivot 31 carrying both the brake lever 40 and the link 33, the spring 70 presses the lower end of the link 33 against the outer face of the outer flange 24 of the brake head 22, while the shoulder 71 bears against one face of the brake lever 40. Thus by the arrangement described, the links and levers are held against rattling or chattering by the spring-pressed pivots. It is understood that by the use of the compression springs 70, sufficient friction is caused between the links and levers and the adjacent walls of the flanges, and members of the brake heads and brackets to prevent rattling of the links and levers or chattering up and down when the brakes are applied.

Having thus described my invention, I claim as new and desire to secure by Letters Patent:—

1. A brake hanger, comprising a brake head carrying the brake shoe, a fixed hanger bracket, a pair of spaced transverse pivots on the brake head, a pair of similarly spaced pivots on the said bracket, the said pivots of the brake head having their axes extending in a plane parallel to the plane in which extend the axes of the pivots of the bracket, and parallel links connecting the pivots of the said brake head with the pivots of the said bracket, the said pivots being slidable lengthwise and pressed on by springs in the direction of their length, the brake head and the hanger bracket having spaced members between which fit the corresponding ends of the links.

2. A brake hanger, comprising a brake head carrying the brake shoe, a fixed hanger bracket, a pair of spaced transverse pivots on the brake head, a pair of similarly spaced pivots on the said bracket, the said pivots of the brake head having their axes extending in a plane parallel to the plane in which extend the axes of the pivots of the bracket, and parallel links connecting the pivots of the said brake head with the pivots of the said bracket, the pivots having shoulders bearing against one side of the corresponding links to press them laterally against the brake head and bracket.

3. In a car truck, the combination of a truck frame, hanger brackets attached to the truck frame and having bifurcated ends, the members of which extend lengthwise of the truck frame, parallel transverse pivots held in the members of the bifurcated end of the said hanger brackets, parallel links extending with their upper ends between the said hanger members and hung on the said pivots, brake heads having side flanges extending longitudinally, parallel pivots held transversely in the said brake head flanges and engaged by the lower ends of the said links, one of the links extending between the said flanges and the other link extending outside one of the flanges, a brake lever extending between the said flanges and fulcrumed on the pivot engaged by the outside link, and brake shoes attached to the said brake heads and adapted to engage the peripheral faces of car wheels.

LEWIS E. KEIL.

Copies of this patent may be obtained for five cents each, by addressing the "Commissioner of Patents, Washington, D. C."